(12) United States Patent
Ginsberg et al.

(10) Patent No.: US 12,731,993 B2
(45) Date of Patent: Sep. 8, 2026

(54) ELECTRICAL GRID OPERATIONS USING ON FORECAST HORIZON PLANNING

(71) Applicant: X Development LLC, Mountain View, CA (US)

(72) Inventors: Matthew L. Ginsberg, Eugene, OR (US); Benoit Schillings, Los Altos Hills, CA (US)

(73) Assignee: X Development LLC, Mountain View, CA (US)

( * ) Notice: Subject to any disclaimer, the term of this patent is extended or adjusted under 35 U.S.C. 154(b) by 509 days.

(21) Appl. No.: 18/332,474

(22) Filed: Jun. 9, 2023

(65) Prior Publication Data

US 2023/0402844 A1 Dec. 14, 2023

Related U.S. Application Data

(60) Provisional application No. 63/351,948, filed on Jun. 14, 2022.

(51) Int. Cl.

| | |
|---|---|
| ***H02J 3/00*** | (2026.01) |
| ***G05B 17/02*** | (2006.01) |
| ***H02J 103/30*** | (2026.01) |

(52) U.S. Cl.
CPC .............. *H02J 3/003* (2020.01); *G05B 17/02* (2013.01); *H02J 3/004* (2020.01); *H02J 2103/30* (2026.01)

(58) Field of Classification Search
CPC ........ H02J 3/003; H02J 3/004; H02J 2203/20; G05B 17/02
See application file for complete search history.

(56) References Cited

U.S. PATENT DOCUMENTS

| | | | | |
|---|---|---|---|---|
| 11,063,555 | B2 * | 7/2021 | Sanfilippo | H02S 50/10 |
| 11,605,034 | B1 * | 3/2023 | Biryukov | G06Q 10/04 |
| 2004/0128261 | A1 * | 7/2004 | Olavson | G06Q 30/02 705/400 |
| 2016/0281607 | A1 * | 9/2016 | Asati | F02C 7/26 |
| 2019/0165580 | A1 * | 5/2019 | Doherty | G05B 13/042 |

OTHER PUBLICATIONS

Khuntia, Swasti R., et al. "Time-horizons in the planning and operation of transmission networks: an overview." IET generation, transmission & distribution 10.4 (2016): 841-848. (Year: 2016).*

(Continued)

*Primary Examiner* — Robert E Fennema
*Assistant Examiner* — Vi N Tran
(74) *Attorney, Agent, or Firm* — Fish & Richardson P.C.

(57) ABSTRACT

Methods, systems, and apparatus, including computer programs encoded on computer-storage media, for operating sources of electricity in an electrical grid having a forecasting error rate are described. In some implementations, a method includes selecting a forecast horizon based on the forecasting error rate; performing an optimization process for dispatch planning of the electrical grid for the selected forecast horizon; automatically operating one or more power sources of the electrical grid in accordance with the dispatch planning for a first time increment; and performing an optimization process for dispatch planning for subsequent time increments within the selected horizon after the first time increment has elapsed.

20 Claims, 6 Drawing Sheets

(56) References Cited

OTHER PUBLICATIONS

Gamrath et al., "The SCIP Optimization Suite 7.0," Technical Report, Optimization Online, Mar. 2020, 48 pages.

Gurobi Optimization, LLC. Gurobi Optimizer Reference Manual, 9.1, 2021, 992 pages.

Knueven et al., "On mixed-integer programming formulations for the unit commitment problem," Informs J. Computing, Jun. 25, 2020, 32(4):857-876.

Nair et al., "Solving mixed integer programs using neural networks," CoRR, Dec. 23, 2020, arxiv.org/abs/2012.13349, 57 pages.

* cited by examiner

ELECTRICAL GRID OPERATIONS USING ON FORECAST HORIZON PLANNING

CROSS-REFERENCE TO RELATED APPLICATIONS

This application claims the benefit under 35 U.S.C. § 119(e) of U.S. Patent Application No. 63/351,948, entitled "Selecting A Forecast Horizon For Dispatch Planning In An Electrical Grid," filed Jun. 14, 2022, which is incorporated herein by reference in its entirety.

FIELD

This specification relates to algorithms for operating sources of electricity in an electrical grid.

BACKGROUND

An electrical grid is a network that generates and delivers power. Electrical grids can include sources of electricity (e.g., power stations and distributed energy resources), electrical substations, power transmission systems, and power distribution systems. The sources of electricity generate power to meet demand. Some sources of electricity can be operated on demand or "dispatched" to generate power, while others, such as renewable energy sources, cannot be controlled by operators. Dispatch planning is used to schedule how the controllable sources of electricity are operated to meet user demand.

SUMMARY

In general, innovative aspects of the subject matter described in this specification relate to algorithms for operating sources of electricity in an electrical grid. For instance, the algorithms described herein can identify an optimization timeframe or forecast horizon based on a known forecasting error of the electrical grid. The optimization timeframe can be used for dispatch planning to minimize carbon emissions or consumption of fossil fuels by the electrical grid in some examples.

One innovative aspect of the subject matter described in this specification is embodied in a method of operating an electrical grid having a forecasting error rate. The method includes selecting a forecast horizon based on the forecasting error rate; performing an optimization process for dispatch planning of the electrical grid for the selected forecast horizon; automatically operating one or more power sources of the electrical grid in accordance with the dispatch planning for a first time increment; and performing an optimization process for dispatch planning for subsequent time increments within the selected horizon after the first time increment has elapsed.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

These and other aspects can each optionally include one or more of the following features. In some implementations, selecting a forecast horizon based on the forecasting error rate includes: for each of a plurality of forecast horizons, dividing the forecast horizon into a sequence of time periods, and, for each time period, performing an optimization process for dispatch planning of the electrical grid based on the forecast horizon and simulating operation of one or more power sources of the electrical grid for the time period based on the dispatch planning and the forecasting error rate to obtain simulation results; and selecting the forecast horizon based on the simulation results.

In some implementations, the simulation results are based on simulated costs.

In some implementations, selecting the forecast horizon based on the simulation results includes: comparing simulated costs of each forecast horizon; and selecting the forecast horizon having the lowest simulated costs.

In some implementations, the simulated costs include carbon costs or fossil fuel consumption or both.

In some implementations, the operation of one or more power sources of the electrical grid is simulated over a period of time between about 100 to 200 times as long as the forecast horizon for each of the plurality of forecast horizons.

In some implementations, optimizing dispatch planning of the electrical grid based on the forecast horizon includes weighting the simulated costs differently across the forecast horizon.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

Like reference numbers and designations in the various drawings indicate like elements. The components shown here, their connections and relationships, and their functions, are meant to be exemplary only, and are not meant to limit the implementations described and/or claimed in this document.

DETAILED DESCRIPTION

In general, the disclosure relates to planning the dispatch of power across the electrical grid. More specifically, the disclosure relates to an algorithm for identifying an optimization timeframe for dispatch planning based on forecasting error. According to conventional wisdom, 48 hours is a reasonable timeframe for optimizing dispatch planning, as it presumably allows an operator a certain amount of time for corrections if a forecast turns out to be inaccurate. However, implementations of the present disclosure have demonstrated that rather than using a fixed 48 hour timeframe, tailoring the projected dispatch projection to a specific forecasting error rate can improve the efficiency of electric grid operations, thereby reducing total cost, carbon emissions and/or consumption of fossil fuels.

Briefly, one example process starts with a particular forecasting error rate that is known to the operator. The process includes solving a mixed integer program for the best set of parameters for a particular timeframe (optimization). The solution is deployed for a certain unit of time, e.g., for one hour (deployment). Optimization and deployment are repeated for the particular combination of forecasting error and timeframe for a lengthy period. The procedure is repeated for several different timeframes, all at the same forecasting error rate. The optimal optimization timeframe is identified based on the timeframe that performed best in terms of the simulated cost.

In some implementations, optimization and deployment are repeated to simulate an entire year of operation. This lengthy timeframe may smooth out the noisy data obtained from the simulation, making it easier to fit parabolic curves to the data to identify the optimum timeframe.

In some implementations, the costs are weighted across the chosen timeframe. For example, for a 48 hour timeframe, the costs incurred in hours 25 to 48 can be weighted by one half of the costs incurred in hours 1 to 24. The costs are weighted, or multiplied by a constant, based on protocols. Multiplication by a constant ensures that the mixed integer program remains linear and, thus, solvable.

Figure 1:
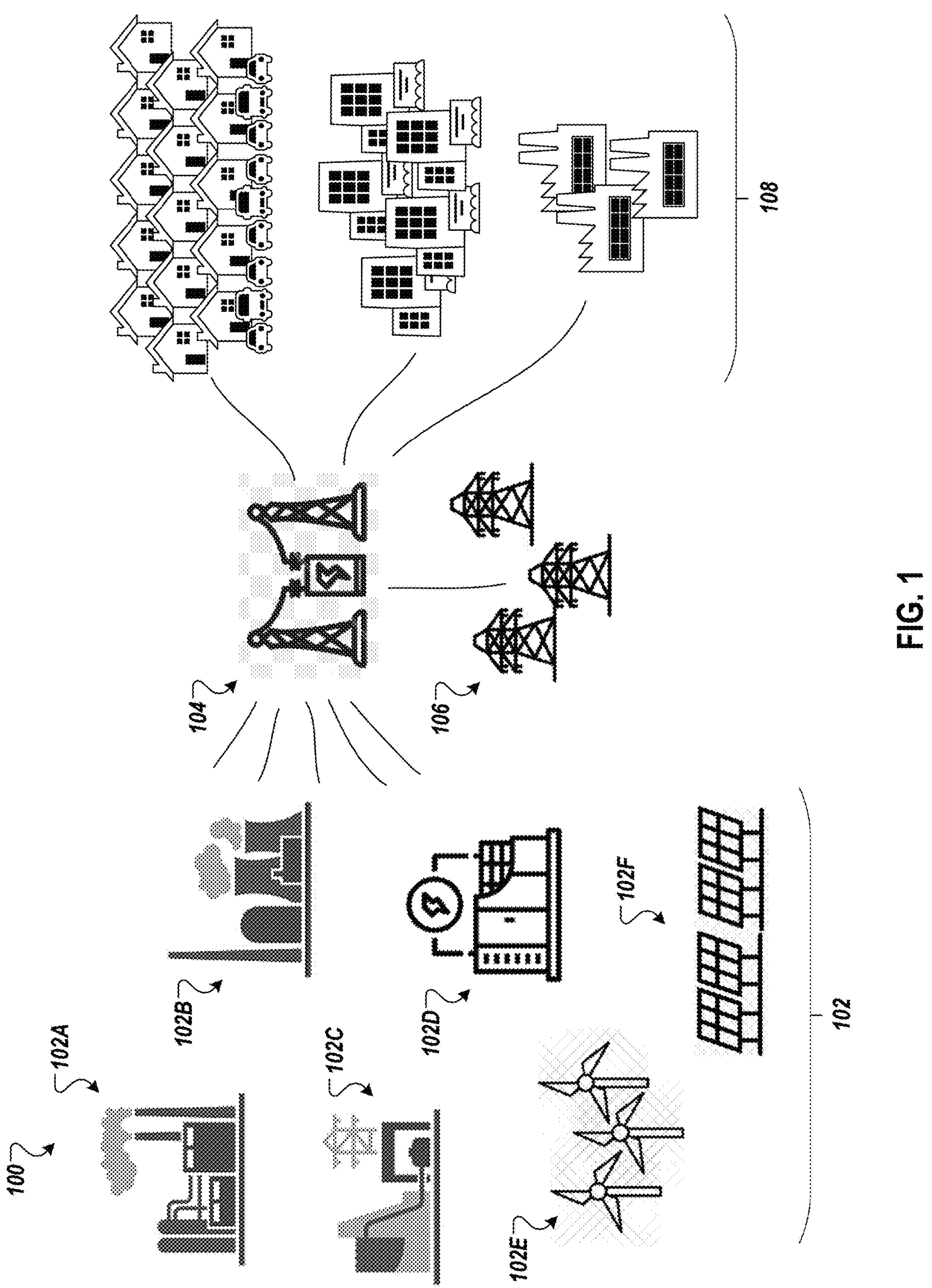
FIG. 1 is a schematic example of an electrical grid.

FIG. 1 depicts a schematic example of an electrical grid 100 that includes power sources 102 (e.g., power stations), one or more electrical substations 104, and a power transmission system 106. The power sources 102 are used to generate power and can include power plants and sources of renewable energy. The electrical substations 104 are used to step voltage up or down for transmission and distribution to consumers 108. The power transmission systems 106 are used to carry power generated by the sources over long distances. In this example, the consumers 108 of electricity can include private households, businesses, and industrial plants.

As described, the power sources 102 can include a mix of power plants and sources of renewable energy. For example, the power plants can include a natural gas power plant 102A, a nuclear power plant 102B, a hydroelectric power plant 102C, and a plurality of grid batteries 102D. Some of the power plants, e.g., the hydroelectric power plant 102C, use renewable energy to generate electricity. Other sources of renewable energy in the grid 100 include wind power 102E and solar power 102F. In other implementations, the electrical grid can incorporate a mix of power generated through coal, biomass, geothermal power, or ocean thermal energy conversion, to name a few examples.

Figure 2A:
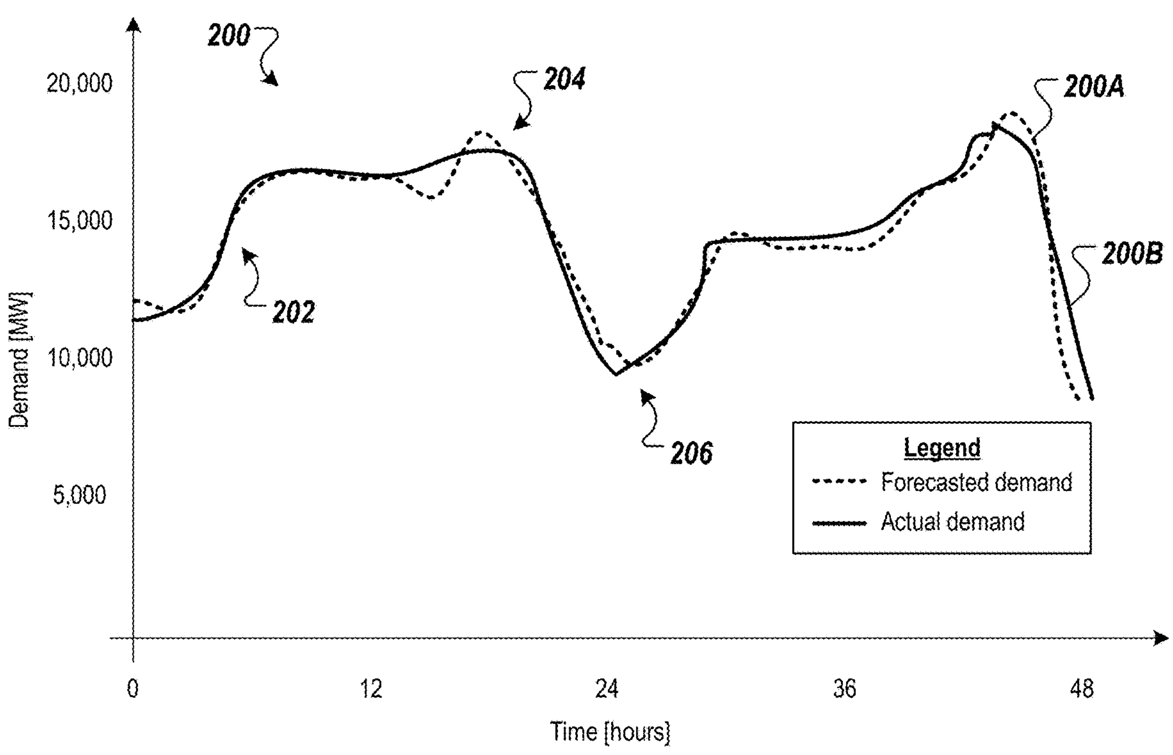
FIG. 2A shows an example demand or load curve for the electrical grid of FIG. 1.

FIG. 2A shows an example demand curve 200 for the electrical grid 100 of FIG. 1. Specifically, the demand curve 200 shows the load placed on the electrical grid 100 by the consumers 108 over a period of 48 hours. The demand curve 200 includes a curve 200A for projected or forecasted demand and a curve 200B for the actual load at the forecasted point in time. At 202, the curve 200 ramps up slowly to indicate morning electricity use. Demand continues to increase throughout the day and may peak at the evening time at 204. Overnight, demand for energy drops again, as shown at 206.

Leaving sudden, unexpected spikes in demand aside, short-term energy demand cycles may follow the depicted trends in many cases. However, there is also variability on both the supply and demand sides to some extent. For instance, the grid 100 includes non-dispatchable power sources 102, e.g., wind power 102E and solar power 102F. The longer the forecast horizon, the more difficult it becomes to accurately predict how much power can be generated from these sources at any one point in time. On the demand side, the morning ramp at 202 was conventionally a steep ramp, as a large number of consumers went about their morning routines and commutes within a narrow window. However, even longer term variations in demand can occur unpredictably. For example, more recently, due to the global COVID pandemic, schedules have become more flexible in many cases, spreading morning power consumption over a longer window of time.

Figure 2B:
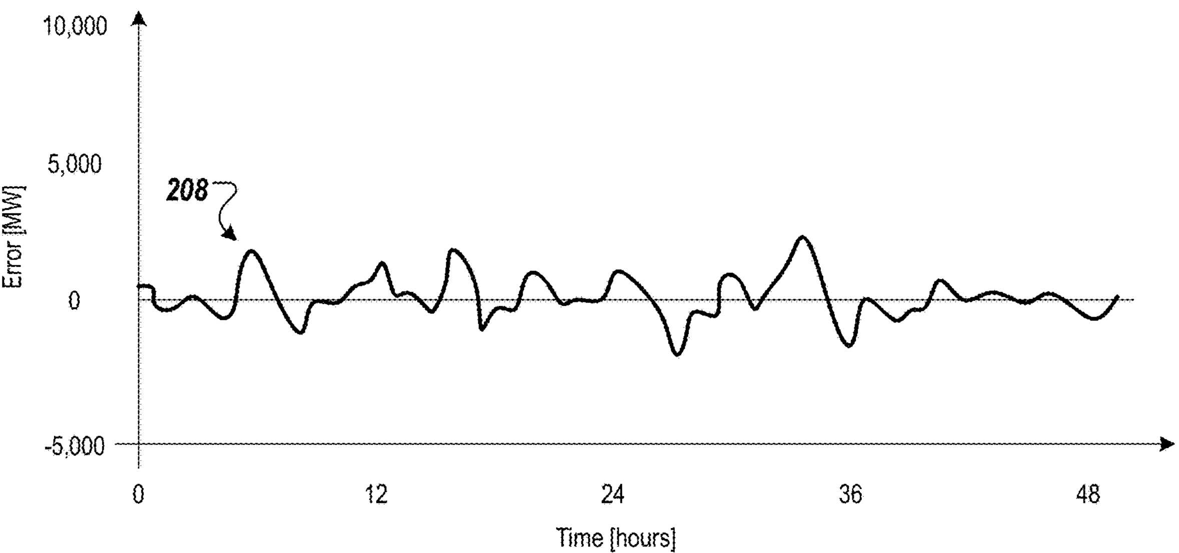
FIG. 2B schematically depicts the error rate associated with the load curve of FIG. 2A.

FIG. 2B schematically depicts the error 208 of the forecasted demand curve 200A, i.e., the difference between the forecasted demand curve 200A and the actual demand curve 200B at each point in time. In some situations, the error curve 208 may be more or less pronounced than depicted herein. In the illustrated example, the error curve 208 is specific to both the electrical grid 100 and to the 48 hours forecasted and implemented in FIG. 2A. The operator of grid 100 may collect error information over a longer period of time to obtain an error rate for the grid 100 expressed, e.g., in a percentage difference from the predicted demand. In many cases, emphasis has been placed on flattening the error curve 208, e.g., creating as accurate of a demand forecast as possible. While an accurate forecast is helpful in many regards, the error rate itself can also be used to adjust the optimization horizon and obtain a dispatch plan that can reduce fossil fuel consumption or carbon emissions in some instances.

Figure 3:
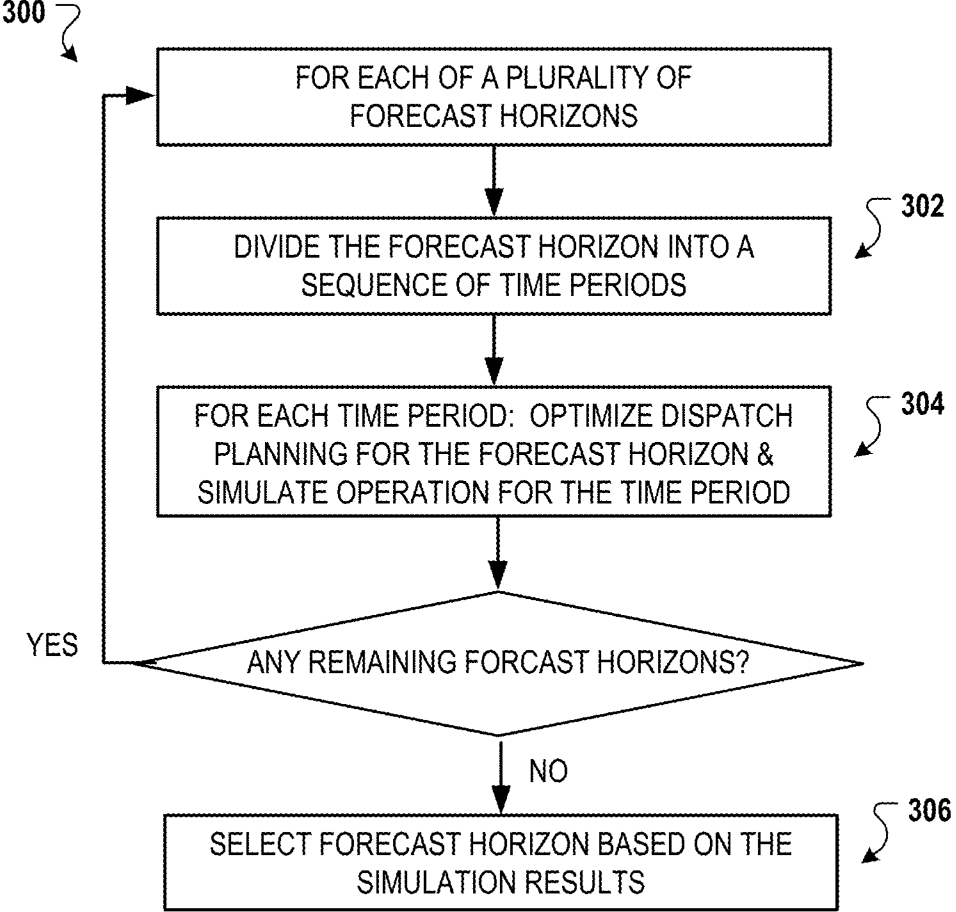
FIG. 3 is a flow diagram for an example process for selecting a forecast horizon for dispatch planning of the electrical grid based on a forecasting error rate according to some implementations of the present disclosure.

FIG. 3 is a flow diagram for an example process 300 for selecting a forecast horizon for dispatch planning based on a forecasting error rate according to some implementations of the present disclosure. For example, the process 300 can be used to select the forecast horizon in the process 500 of FIG. 5. The process 300 includes, for each of a plurality of forecast horizons: dividing the forecast horizon into a sequence of time periods (302), as described below in more detail below.

For each time period: an optimization process for the dispatch planning of the electrical grid is performed based on the forecast horizon and simulating operation of one or more power sources of the electrical grid for the time period based on the dispatch planning and the forecasting error rate (304). The optimization process for dispatch planning can include using forecast demand, e.g., demand values shown by the curve 200A in FIG. 2A, to obtain a dispatch solution. The dispatch solution can be a cost-optimized schedule for operating the power sources 102 to provide electricity to meet the actual demand over the forecasted time period, e.g., as shown by the curve 200B in FIG. 2A. One or more power sources can be simulated as operating for each forecast time horizon according to the respective dispatch planning computed for that forecast time horizon by the optimization process. Simulating operation of the one or more power sources can include using an actual demand instead of the forecast demand, e.g., by adding or subtracting the forecast error rate multiplied by the forecast demand from the forecast demand in megawatts, as expressed by the following expression:

Simulated Actual Demand [MW]=(1+error)*Forecast Demand [MW]

Operation of the power sources can be simulated using an electric power grid simulation model to obtain simulated operation costs (e.g., estimated carbon emissions and expended fuel resources).

At 304, the process 300 can use an optimization/simulation loop that takes as input a linear encoding e of the electrical grid, an objective function $f$, a starting time $t_1$ and an ending time $t_2$, a granularity g, and a forecast horizon h. The optimization/simulation loop can return a sequence of costs $c_1, \ldots, c_n$, where $c_1$ is the cost incurred in the time interval $[t_1, t_1+g]$ and $c_n$ is the cost incurred in the final interval $[t_2, t_2+g]$. Generally speaking, a cost $c_i$ where $1<i<n$ is the cost incurred in the time interval $[t_1+(i-1)g, t_1+ig]$. For example, assuming a granularity g of 1 hour and a forecast horizon h of 20 hours, the dispatch optimization process can return a sequence of projected costs $c_{1p}, c_{2p}, c_{3p}, \ldots, c_{20p}$ for each of the twenty, one-hour time units in the 20-hour forecast horizon. Simulating the operation of the electrical grid for the first hour in the 20 hour horizon results in a simulated cost $C_{1s}$ for that hour.

The objective function $f$ can be, e.g., a mathematical equation that describes the total fuel cost used in power generation by the simulated electrical grid. In some cases, the objective function can include a notional cost based on the carbon emissions generated by the operation of the electrical grid or other factors.

The starting time $t_1$ and ending time $t_2$ represent the duration of the optimization/simulation loop. For example, the loop can be run to simulate operation of the electrical grid over the course of a year. In other instances, operation can be simulated for a different duration, such as six months, or any other duration that is greater than a multiplier of the forecast horizon, e.g., 100 to 200 times as long as the forecast horizon. Increasing the duration may smooth out noisy data in some cases, making it easier to fit parabolic curves to the data to identify the optimum forecast horizon, as described in more detail in reference to FIG. 4. During the optimization process, the optimizer processes operations of the electrical grid starting at the starting time $t_1$ until some final time $t_f$ that is smaller than the ending time $t_2$. If the optimizer has a forecast horizon h, then the optimizer would typically run until the time $t_1+h$. However, the optimizer cannot run past the ending time $t_2$, and thus runs until a final time $t_f$ that is $\min(t_2, t_1+h)$. For example, the optimization/simulation loop may be run to simulate a duration of $t_2-t_1$ equal to 8760 hours (one year) using a forecast horizon of 41 hours. For the greater part of this process, the loop is repeatedly run in steps of 41 hours that correspond to the forecast horizon, e.g., the final time $t_f$ is equal to $t_1+h$. As the loop continues to run, the time left until the ending time $t_2$ gets smaller and smaller until it is less than the forecast horizon of 41 hours (e.g., the last 40 hours of the year). At this point in time, the final time $t_f$ is no longer equal to $t_1+h$, but rather, to the ending time $t_2$.

The granularity g represents individual units of time that make up the duration of the optimization/simulation loop. For example, for a duration of $t_2-t_1$ equal to 8760 hours (one year), a granularity of 1 hour means that the optimization/simulation loop is executed for n=8760 time periods. In some cases, the granularity g may be a length of time that is different from 1 hour, e.g., 30 minutes, 2 hours, or 4 hours. The granularity also corresponds to the length of the time periods at 402. For example, the forecast horizon can be divided into equal length or varying length time periods. In some implementations, a three month forecast horizon can be divided into daily or hourly time periods. In some implementations, a three month forecast horizon can be divided into unequal time periods. For example, the time periods may expand later in the forecast horizon. For example, the three month forecast horizon can be divided into hourly time periods for the first two months then daily time periods for the third month.

The forecast horizon h is one of the plurality of forecast horizons that is evaluated using the process 300. For example, the process 300 can be used to evaluate forecast horizons between 12 and 48 hours for a given electrical grid and forecasting error. In some cases, the forecast horizons can be incremented by one hour to evaluate a 12-hour horizon, a 13-hour horizon, a 14-hour horizon, . . . and so on. In other cases, the process 300 can use larger increments to obtain a plurality of forecast horizons for evaluation, e.g., a 12-hour horizon, a 14-hour horizon, a 16-hour horizon, . . . and so on.

The optimization/simulation loop can entail the following:

1. Setting the initial time to be $t_1$ and the final time $t_f$ to be $\min(t_2, t_1+h)$
2. using a standard mixed integer programming (MIP) encoding of the dispatch problem and a MIP solver to compute optimal generation and power flow over the $[t_1, t_f]$ interval
3. Using the optimization results to simulate the generation and power flow of the electrical grid from $t_1$ to $t_f$, evaluating the objective function $f$ over the same interval to determine the costs resulting from the operation
4. Incrementing $t_1$ by g. If the result is at least $t_2$, stopping and returning the list of costs. If the new starting time is less than $t_2$ (and therefore not greater than $t_2-g$), returning to step 1

Although the previous refers to "costs," costs are not necessarily financial in nature and can represent, e.g., carbon emissions generated by the electrical grid. Assuming, e.g., a granularity g of 1 hour and a duration $t_2-t_1$ of one year, the aforementioned process will return a simulated cost for each hour of the year. These costs (the 8760 hourly cost values) can be added together to obtain a total or aggregated cost for the year of operation.

The forecast horizon is selected based on the simulation results (306). In some cases, the simulation results are based on the simulated costs. For example, the simulated costs can be plotted relative to the forecast horizon. Curve fitting techniques can be used to fit a parabolic curve to the simulated costs, as described in reference to FIG. 4. For example, the forecast horizon can be selected based on the lowest monetary or carbon costs. In instances in which a parabolic curve has been fitted to the simulated costs, the lowest costs can be defined as the minimum of the parabola. In other cases, selecting the forecast horizon based on the simulation results can include comparing the simulated costs of each forecast horizon and selecting the forecast horizon having the lowest simulated costs.

Some implementations of the process 300 include weighting the costs associated with each time period differently. The costs in hours closer to $t_1$ can be weighted more heavily than the costs in hours closer to $t_f$, reflecting the fact that the simulation is more likely to be accurate at nearby times. Weighting the costs across the forecast horizon can include multiplying the costs by a constant based on predetermined protocols. Multiplication by a constant ensures that the mixed integer program remains linear and, thus, solvable.

Figure 4:
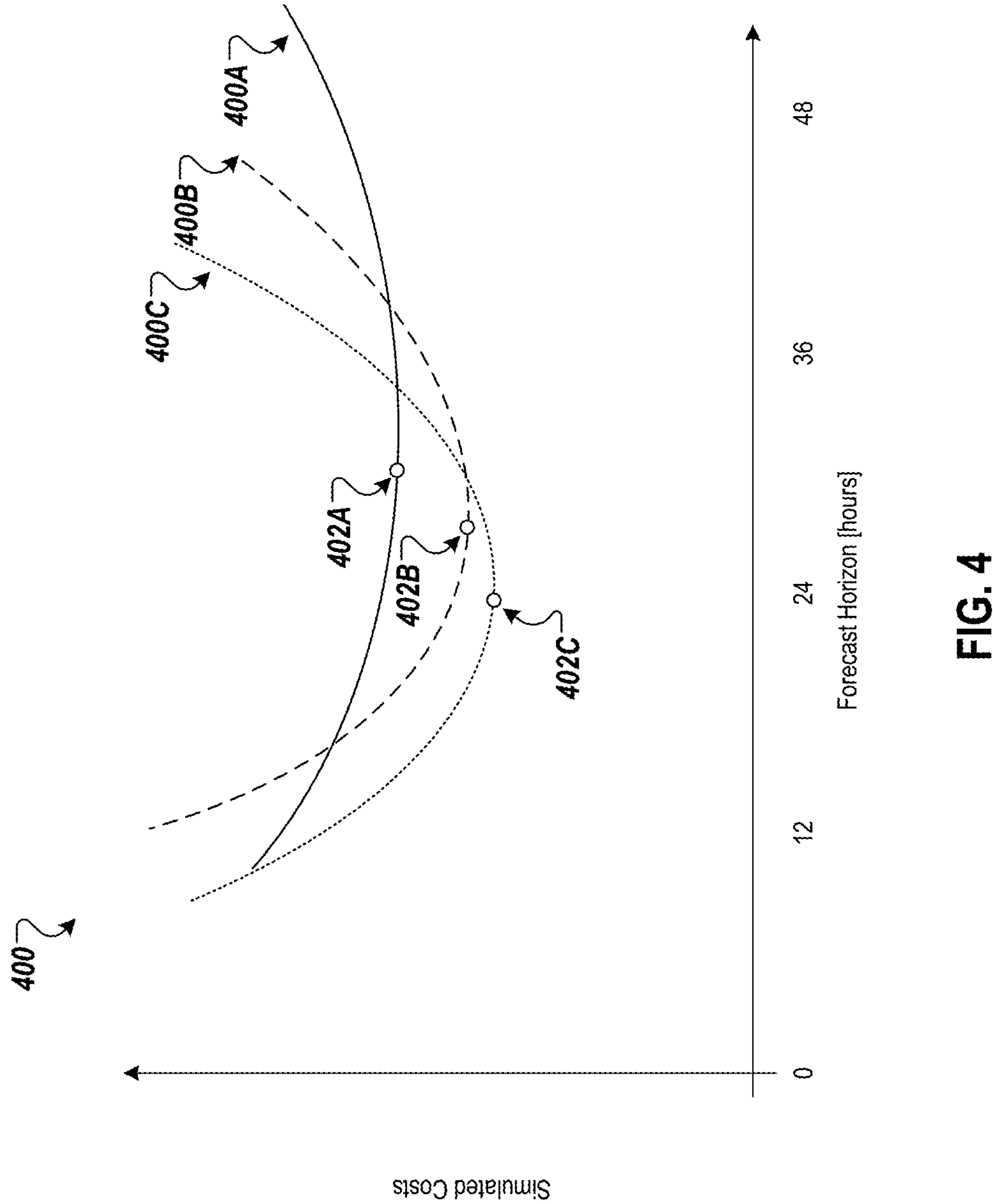
FIG. 4 depicts an example graph with parabolic curves that correspond to different forecast horizons and forecasting error rates.

FIG. 4 depicts an example graph 400 with parabolic curves that correspond to different forecast horizons and forecasting error rates. For example, the curves 400A, 400B, 400C can correspond to error rates of 9%, 7%, and 4% respectively. The curves 400A, 400B, 400C have been fitted to data obtained from the simulation of grid operation as described above. For the sake of clarity, the data points have not been shown in the figure. The minima 402A, 402B, 402C indicates the forecast horizon with the best simulation performance or the lowest simulated costs. For example, the simulated costs can include monetary costs, fossil fuel consumption, or carbon costs. The graph 400 illustrates that as the forecasting error decreases, both the simulated costs and the forecast horizon decrease. Taking the curve 400C, which corresponds to an error rate of 4%, the process 500 of FIG. 5 can be run using a forecast horizon of 24 hours, as opposed to the conventional 48 hours.

Figure 5:
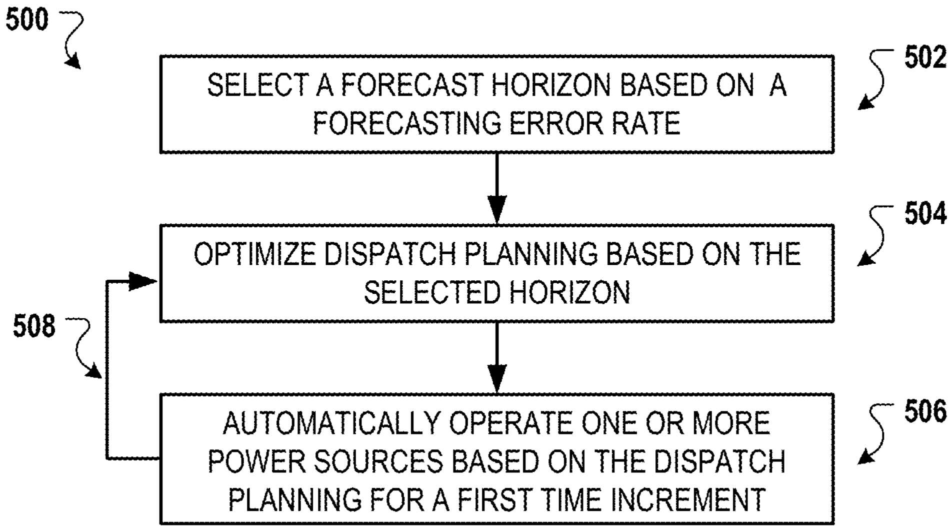
FIG. 5 is a flow diagram for an example process for operating an electrical grid according to some implementations of the present disclosure.

FIG. 5 is a flow diagram for an example process 500 for operating an electrical grid according to some implementations of the present disclosure. For example, the process 500 can be used to operate one or more power sources 102 in the grid 100. The process 500 can be based on a similar loop to the optimization/simulation loop described in conjunction with process 300. However, instead of simulating the behavior of the optical grid to calculate generation, power flow, and costs, the process 500 can employ an optimization/implementation loop, in which the optimization problem is initially solved with one set of demand forecast values. A time period is allowed to elapse in which the solution is used to generate power in the electrical grid. Then the problem is re-solved with additional forecast information.

For example, the additional forecast information can include updated and accurate information at the start of the forecast horizon and new forecast data beyond the horizon of the earlier analysis, as illustrated by the following scenario. Assuming that it is noon, an optimization process for dispatch planning of the electrical grid is performed for a particular forecast horizon (e.g., the next 36 hours). This can entail using forecast demand for the next 36 hours to obtain a dispatch solution, namely a cost-optimized schedule for operating power sources over the next 36 hours to meet forecast demand. From noon until 1:00 μm, the power sources are operated according to the dispatch solution generated at noon. At 1:00 μm, there is now actual demand data for the time period between noon and 1:00 pm, whereas there was previously only forecast demand. However, the noon dispatch solution was based on forecast demand that does not account for the actual demand data in the past hour. In addition, new or more accurate forecast demand may be available for the time from 1:00 μm to 2:00 pm. For instance, there may have been a change in weather between noon and 1:00 pm that influences demand and was not accounted for in the earlier forecast. The updated actual demand information for noon to 1:00 μm and the updated forecast demand are used at 1:00 pm to perform an optimization process for dispatch planning for the next 36 hours, and the optimization/implementation loop is repeated.

The process 500 includes selecting a forecast horizon based on a forecasting error rate (502). For example, the process 300 described in reference to FIG. 3 can be used to select the forecast horizon. In some implementations, the selected forecast horizon may vary from the standard 48 hour forecast horizon often used in dispatch planning.

The process 500 includes performing an optimization process for dispatch planning of the electrical grid for the selected forecast horizon (504). The optimization process for dispatch planning can include using forecast demand, e.g., demand values shown by the curve 200A in FIG. 2A, to obtain a dispatch solution. The dispatch optimization problem can be converted to a mixed integer program (MIP) that is solved using a solver as described in reference to FIG. 3. In some cases, dispatch planning can be optimized to minimize carbon emissions or consumption of fossil fuels. In other cases, the dispatch optimization problem can be solved to minimize the financial costs associated with operating the grid. For example, the dispatch optimization problem can be solved to minimize the same type of cost (e.g., monetary or carbon emissions) as in process 300.

The process 500 includes operating one or more power sources of the electrical grid based on the dispatch planning for a time increment, e.g., one hour (506). As described in reference to FIG. 1 above, an electrical grid may include one or more non-dispatchable power sources that can be controlled by the grid operator. Further, not all of the available power sources may be dispatched at any given time. Accordingly, implementations of the present disclosure can involve automatically operating one or more of the dispatchable power sources in accordance with the dispatch planning for a first time increment. For example, automatically operating one or more power sources can include sending operating instructions to power source controllers. The instructions can include code and data that cause the power sources to operate in accordance with the dispatch planning.

The process 500 includes performing an optimization process for dispatch planning for subsequent time increments within the selected horizon after the first time increment has elapsed (508). For example, steps (504-506) are repeated for subsequent time increments in an optimization/implementation loop. In the process 500, the time increments can correspond to the granularity g described above.

Figure 6:
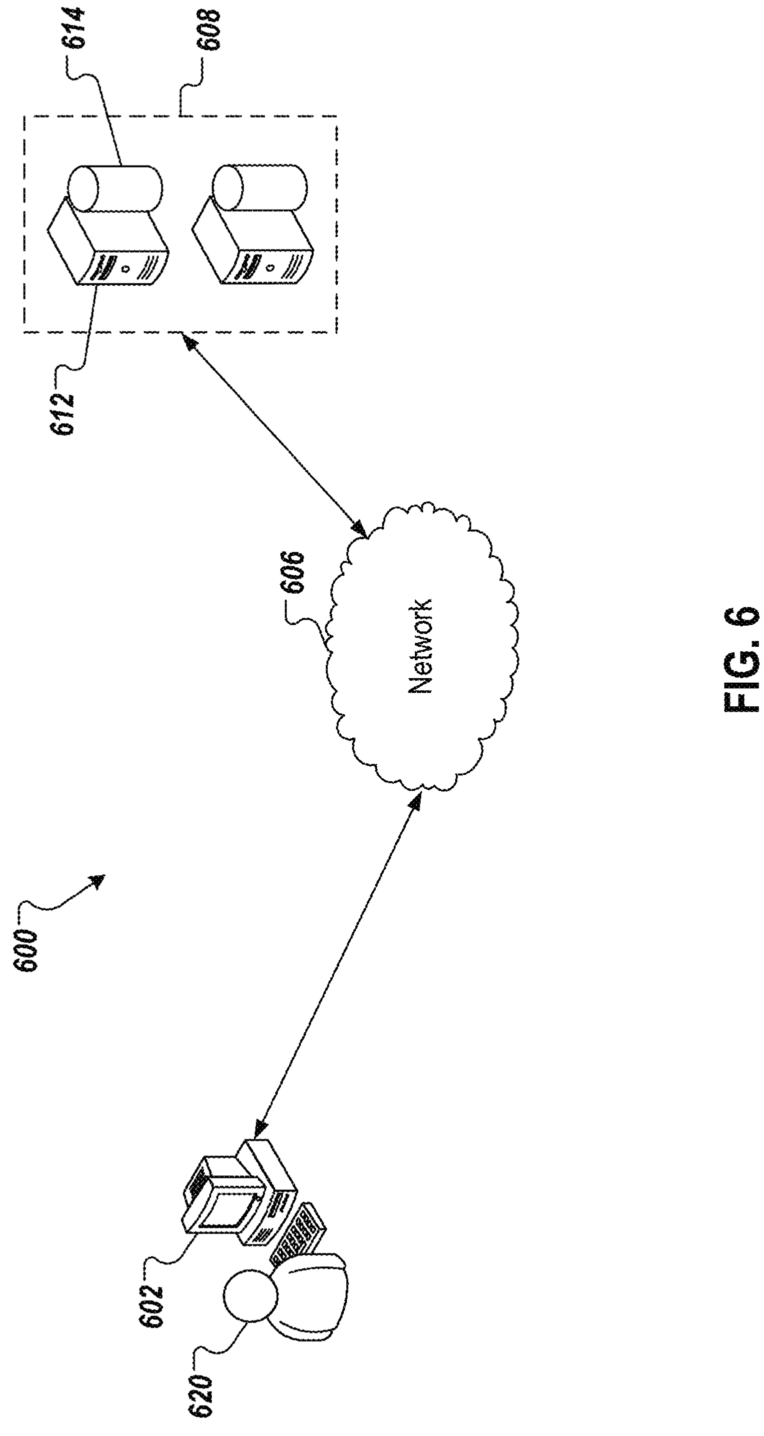
FIG. 6 depicts an example system that can execute implementations of the present disclosure.

FIG. 6 depicts an example system 600 that can execute implementations of the present disclosure. The example system 600 includes a computing device 602, a back-end system 608, and a network 606. In some examples, the network 606 includes a local area network (LAN), wide area network (WAN), the Internet, or a combination thereof, and connects web sites, devices (e.g., the computing device 602), and back-end systems (e.g., the back-end system 608). In some examples, the network 606 can be accessed over a wired and/or a wireless communications link.

In some examples, the computing device 602 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In the depicted example, the back-end system 608 includes at least one server system 612, and data store 614 (e.g., database and knowledge graph structure). In some examples, the at least one server system 612 hosts one or more computer-implemented services that users can interact with using computing devices. For example, the server system 612 can host one or more applications that are provided as part of a system for simulating an electric power transmission system in accordance with implementations of the present disclosure.

In some examples, the back-end system 608 hosts a system for simulating an electric power transmission system having a forecasting error rate in accordance with implementations of the present disclosure. For example, a user 620 can interact with the system using the computing device 602. In some examples, the user 620 can operate an electrical grid. In some examples, the user 620 can select a forecast horizon based on a forecasting error rate, as described in further detail herein.

Implementations of the subject matter and the functional operations described in this specification can be implemented in digital electronic circuitry, in tangibly-implemented computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including, by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of sub-combinations.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be helpful. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A method of operating an electrical grid, the method comprising:

selecting a forecast horizon based on a forecasting error rate of the electric grid;

performing an optimization process for dispatch planning of the electrical grid for the selected forecasting horizon;

automatically operating one or more power sources of the electrical grid in accordance with the dispatch planning for a first time increment; and performing an optimization process for dispatch planning for subsequent time increments within the selected horizon after the first time increment has elapsed.

2. The method of claim 1, wherein selecting a forecast horizon based on the forecasting error rate comprises:

for each of a plurality of forecast horizons:

dividing the forecast horizon into a sequence of time periods, and for each time period: performing an optimization process for dispatch planning of the electrical grid based on the forecast horizon and simulating operation of one or more power sources of the electrical grid for the time period based on the dispatch planning and the forecasting error rate to obtain simulation results; and selecting the forecast horizon based on the simulation results.

3. The method of claim 2, wherein the simulation results are based on simulated costs.

4. The method of claim 3, wherein the simulated costs comprise carbon costs or fossil fuel consumption or both.

5. The method of claim 2, wherein selecting the forecast horizon based on the simulation results comprises:

comparing simulated costs of each forecast horizon; and selecting the forecast horizon having the lowest simulated costs.

6. The method of claim 2, wherein for each of the plurality of forecast horizons, the operation of one or more power sources of the electrical grid is simulated over a period of time between about 100 to 200 times as long as the forecast horizon.

7. The method of claim 2, wherein optimizing dispatch planning of the electrical grid based on the forecast horizon comprises weighting the simulated costs differently across the forecast horizon.

8. An electric grid operation system, comprising:

one or more processors; and a computer-readable storage device coupled to the one or more processors and having instructions stored thereon which, when executed by the one or more processors, cause the one or more processors to perform operations comprising:

selecting a forecast horizon based on a forecasting error rate of the electric grid;

performing an optimization process for dispatch planning of the electrical grid for the selected forecasting horizon;

automatically operating one or more power sources of the electrical grid in accordance with the dispatch planning for a first time increment; and performing an optimization process for dispatch planning for subsequent time increments within the selected horizon after the first time increment has elapsed.

9. The system of claim 8, wherein selecting a forecast horizon based on the forecasting error rate comprises:

for each of a plurality of forecast horizons:

dividing the forecast horizon into a sequence of time periods, and for each time period: performing an optimization process for dispatch planning of the electrical grid based on the forecast horizon and simulating operation of one or more power sources of the electrical grid for the time period based on the dispatch planning and the forecasting error rate to obtain simulation results; and selecting the forecast horizon based on the simulation results.

10. The system of claim 9, wherein the simulation results are based on simulated costs.

11. The system of claim 10, wherein the simulated costs comprise carbon costs or fossil fuel consumption or both.

12. The system of claim 9, wherein selecting the forecast horizon based on the simulation results comprises:

comparing simulated costs of each forecast horizon; and selecting the forecast horizon having the lowest simulated costs.

13. The system of claim 9, wherein for each of the plurality of forecast horizons, the operation of one or more power sources of the electrical grid is simulated over a period of time between about 100 to 200 times as long as the forecast horizon.

14. The system of claim 9, wherein optimizing dispatch planning of the electrical grid based on the forecast horizon comprises weighting the simulated costs differently across the forecast horizon.

15. Non-transitory computer-readable storage media coupled to one or more processors and having instructions stored thereon which, when executed by the one or more processors of an electric grid operation system, cause the one or more processors to perform operations comprising:

selecting a forecast horizon based on a forecasting error rate of the electric grid;

performing an optimization process for dispatch planning of the electrical grid for the selected forecasting horizon;

automatically operating one or more power sources of the electrical grid in accordance with the dispatch planning for a first time increment; and performing an optimization process for dispatch planning for subsequent time increments within the selected horizon after the first time increment has elapsed.

16. The media of claim 15, wherein selecting a forecast horizon based on the forecasting error rate comprises:

for each of a plurality of forecast horizons:

dividing the forecast horizon into a sequence of time periods, and for each time period: performing an optimization process for dispatch planning of the electrical grid based on the forecast horizon and simulating operation of one or more power sources of the electrical grid for the time period based on the dispatch planning and the forecasting error rate to obtain simulation results; and selecting the forecast horizon based on the simulation results.

17. The media of claim 16, wherein the simulation results are based on simulated costs.

18. The media of claim 16, wherein selecting the forecast horizon based on the simulation results comprises:

comparing simulated costs of each forecast horizon; and selecting the forecast horizon having the lowest simulated costs.

19. The media of claim 16, wherein for each of the plurality of forecast horizons, the operation of one or more power sources of the electrical grid is simulated over a period of time between about 100 to 200 times as long as the forecast horizon.

20. The media of claim 16, wherein optimizing dispatch planning of the electrical grid based on the forecast horizon comprises weighting the simulated costs differently across the forecast horizon.

* * * * *